United States Patent
Zeng et al.

(10) Patent No.: US 12,061,649 B2
(45) Date of Patent: Aug. 13, 2024

(54) GRAPH CLUSTERING METHOD BASED ON PERCEPTION APPLICATION ALGORITHM SEMANTICS AND COMPUTER READABLE MEDIUM

(71) Applicant: TONGJI UNIVERSITY, Shanghai (CN)

(72) Inventors: Guosun Zeng, Shanghai (CN); Tengteng Cheng, Shanghai (CN); Chunling Ding, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/951,120

(22) Filed: Sep. 23, 2022

(65) Prior Publication Data

US 2023/0195795 A1 Jun. 22, 2023

(30) Foreign Application Priority Data

Dec. 22, 2021 (CN) .......................... 202111580817.7

(51) Int. Cl.
*G06F 16/00* (2019.01)
*G06F 16/901* (2019.01)
*G06F 18/2323* (2023.01)

(52) U.S. Cl.
CPC ...... *G06F 16/9024* (2019.01); *G06F 18/2323* (2023.01)

(58) Field of Classification Search
None
See application file for complete search history.

(56) References Cited

U.S. PATENT DOCUMENTS

2003/0033582 A1* 2/2003 Klein .................. G06F 16/9024
716/136

\* cited by examiner

*Primary Examiner* — Anhtai V Tran
(74) *Attorney, Agent, or Firm* — JCIP GLOBAL INC.

(57) ABSTRACT

The invention relates to a graph clustering method based on perception application algorithm semantics and a computer readable medium. The graph clustering method includes: acquiring original graph data G and a graph's application algorithm A; initializing a subgraph $G_i$; randomly selecting a vertex v and a corresponding connecting edge thereof from the graph G, and deleting the v and the corresponding edge thereof from the graph G; computing a semantic serial degree after adding the vertex v into the subgraph $G_i$; determining a clustering block with the maximum semantic serial degree, and adding the vertex v and the corresponding connecting edge into the subgraph; repeating the steps until the graph G is empty; and completing graph clustering, and outputting a clustering result. Compared with the prior art, the method provided by the invention has the advantages of being able to greatly accelerate application analysis and mining of big graph data.

18 Claims, 1 Drawing Sheet

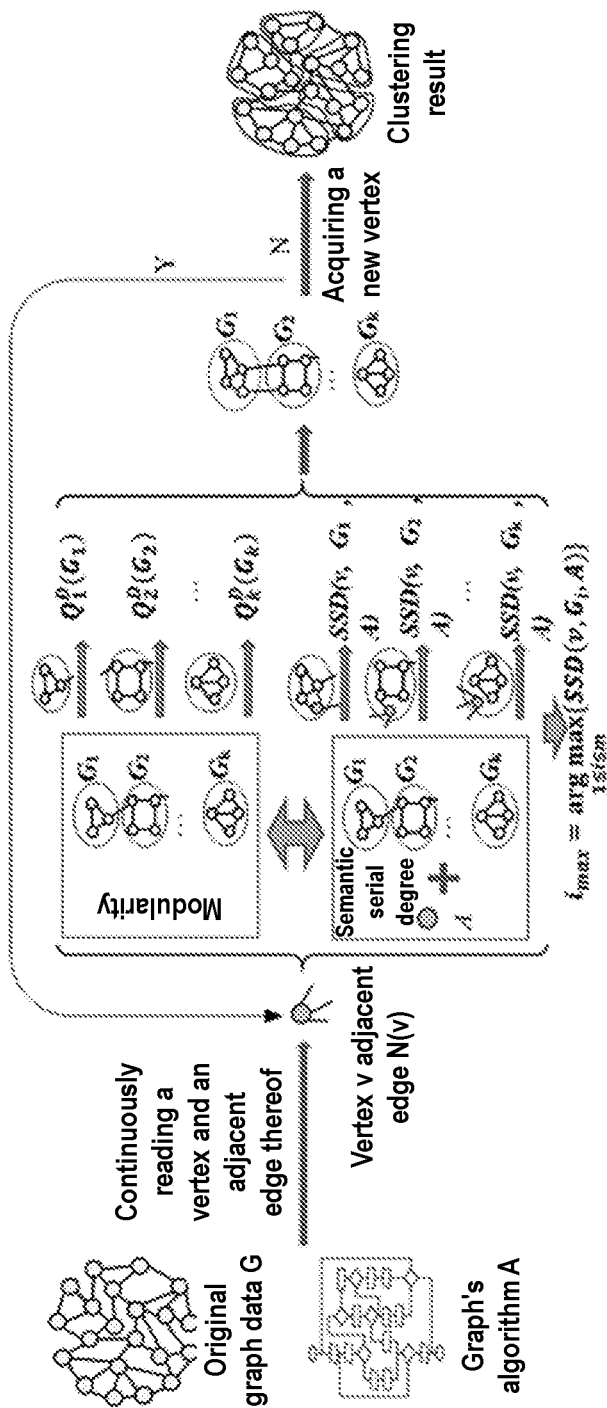

GRAPH CLUSTERING METHOD BASED ON PERCEPTION APPLICATION ALGORITHM SEMANTICS AND COMPUTER READABLE MEDIUM

CROSS-REFERENCE TO RELATED APPLICATION

This application claims the priority benefit of China application serial no. 202111580817.7, filed on Dec. 22, 2021. The entirety of the above-mentioned patent application is hereby incorporated by reference herein and made a part of this specification.

TECHNICAL FIELD

The present relates to the technical field of graph clustering, and in particular relates to a graph clustering method based on parallel computing and perception application algorithm semantics, and a computer readable medium.

BACKGROUND

With the rapid development of information technologies such as mobile Internet and intelligent terminals, a large number of digital application services emerged, including social networks. Web search, smart cities, and bio-structures. Data entities generated in these practical applications are linked with one another, and therefore naturally associated with graphs. In building models with graph data structures, vertexes on a graph are used to represent entities, and connecting edges represent close relationships between entities. Graph data generated by the application services are large in scale and have great value. And the value is often identified by designing various graph algorithms. At present, there are a large number of graph algorithms, such as a graph traversal algorithm, a strong-connectivity algorithm, and a shortest path algorithm. Among them, the most commonly used is "graph clustering", which provides necessary means and tools for analyzing the inherent features and rules and identifying the hidden values of the big graph data. Existing data clustering methods include: k-means, k-medians and the like for the clustering of general discrete data, and spectral clustering, hierarchical clustering, modularity-based clustering and the like for the clustering of non-discrete graph data. All of them have their own features and suitable application scenarios.

In clustering general discrete data, the data set is divided into k blocks according to a certain relationship between data, enabling a close intra-block data relationship and a loose inter-block relationship. Although such method can also be used for graph clustering, the correlation between vertexes in graph data is ignored, leading to a poor clustering. In the spectral clustering of the graph, the Laplacian matrix is generated based on the structure of graph data and then solved for matrix eigenvalues to get corresponding eigenvectors, which are used to conduct division and clustering. However, as a result of high computational cost in getting eigenvalues, this method is not applicable to the clustering of large-scale graph data. There are two approaches to the hierarchical clustering of graph: divisive clustering and agglomerative clustering. In the former one, graph data are initially seen as a cluster, and the data set is continuously divided into smaller data sets through recursion or iteration based on a certain condition. In the latter one, each vertex data is initially seen as a cluster set, and then these small sets are merged into a large cluster set according to a certain rule. As the hierarchical clustering of graph also requires the information of total graph, it is not applicable to the clustering of large-scale graph data either. A modularity-based graph clustering method usually comprises defining a modularity as a criterion for clustering, and then using the compliance of relationships between each vertex and clustering block target with the defined criterion as a clustering basis. In conclusion, although the above-mentioned graph clustering methods take into consideration the correlation between graph data and are capable of clustering closely-correlated vertexes into one class, they involve graph data alone, without considering the application of graph data, is considered. In other words, they fail to incorporate graph algorithm semantics and thus cannot be directly used for application analysis and mining.

SUMMARY

In order to overcome the shortcomings in the prior art, an objective of the present disclosure is to provide a graph clustering method capable of greatly accelerating application analysis and mining of big graph data and based on perception application algorithm semantics, and a computer readable medium.

An objective of the present disclosure can be achieved by the following technical solutions:

A graph clustering method based on perception application algorithm semantics is provided, including the following steps:

step 1: acquiring original graph data G and a graph's application algorithm A;

step 2: initializing a subgraph $G_i$;

step 3: randomly selecting a vertex v and a corresponding connecting edge thereof from the graph G, and then deleting the v and the corresponding edge thereof from the graph G;

step 4: computing a semantic serial degree after adding the vertex v into the subgraph $G_i$;

step 5: determining a clustering block with the maximum semantic serial degree, and adding the vertex v and the corresponding connecting edge into the subgraph;

step 6: repeating the steps until the graph G is empty; and step 7: completing graph clustering, and outputting a clustering result.

Preferably, the step 1 specifically includes:

acquiring the original graph data:

$$G=(V,E,cw,dw)$$

wherein V is a set of vertexes of the graph G; E is an edge set of the graph G; cw is a set of corresponding weights of the vertexes in the graph G; and dw is a set of corresponding weights of edges in the graph G; and acquiring the graph's application algorithm A, a given constant ρ and the number k of clustering blocks.

Preferably, the step 4 specifically includes:

step 4-1: acquiring an execution pattern of the vertex v in the algorithm A, and acquiring a parallel priority x;

step 4-2: computing modularity $m\_deg_i$ after adding the vertex v into the subgraph $G_i$; and step 4-3: computing the semantic serial degree $SSD_i = e^{-\rho x} \times m\_deg_i$ after adding the vertex v into the subgraph $G_i$.

More specifically, the step 4-1 specifically includes:

the execution pattern of the vertex v in the algorithm A includes order pattern, con-order pattern, separate pattern, jump pattern, choice pattern and no computing pattern; the execution pattern is preset with the parallel priority x according to the degree in favor of parallel computing, and the parallel priority x is directly acquired according to a mapping relation after acquiring the execution pattern of the vertex v in the algorithm A.

More preferably, a computing method of the modularity is as follows:

$$deg(G_i) = coh(G_i)\left(1 - \sum_{j \neq i, j=1}^{k} cou(G_i, G_j)\right)$$

wherein $G_i$ is the subgraph block; $coh(G_i)$ is a relative cohesion of the subgraph block $G_i$; and $cou(G_i, G_j)$ is a relative coupling of the subgraph $G_i$ and all other subgraph blocks $G_j$.

More preferably, a computing method of the relative cohesion $coh(G_i)$ of the subgraph block Gi is as follows:

assuming that one piece of graph data consists of k subgraph blocks $G_1, G_2, \ldots, G_k$, wherein any of the subgraph blocks is recorded as:

$G_i=(V_i, E_i, \psi_i, \omega_i)$, $E_i=E_{in}(G_i) \cup E_{out}(G_i)$, $i \in \{1,2,\ldots,k\}$, the computing method of the relative cohesion is as follows:

$$coh(G_i) = \frac{2|E_{in}(G_i)|}{|V_i| \cdot (|V_i| - 1)} \cdot \frac{\Omega(E_{in}(G_i))}{\Omega(E_c)} \cdot \frac{\Psi(V_i)}{\Psi(V_c)}$$

wherein $E_{in}(G_i)$ is a set of edges in the $G_i$; $E_{out}(G_i)$ is a set of cut edges of the $G_i$ and all other subgraph blocks; $\Psi(V_i)$ is a sum of weights of all vertexes in the subgraph block $G_i$; and $\Omega(E_{in}(G_i))$ is a sum of weights of all connecting edges in the subgraph block $G_i$;

the total graph consisting of k subgraph blocks is recorded as $G_c=(V_c, E_c, \psi_c, \omega_c)$, $\Psi(V_c)$ is a sum of weights of vertexes of $G_c$, and $\Omega$ is a sum of weights of connecting edges of the $G_c$.

More preferably, a computing method of a relative coupling $cou(G_i, G_j)$ of the subgraph block Gi and all other subgraph blocks Gj is as follows:

$$cou(G_i, G_j) = \frac{|E_{cut}(G_i, G_j)|}{|V_i| \cdot |V_j|} \cdot \frac{\Omega(E_{cut}(G_i, G_j))}{\Omega(E_c)}.$$

More specifically, the step 4-3 specifically includes:

For the graph data G=(V, E, ψ, ω), assuming that an application algorithm for executing the graph data is A, the parallel priority is x, the to-be-calculated vertex is v∈ V, the set of adjacent edges is N(v)⊆E, a target subgraph block expected to be added is $G_i=(V_i, E_i, \psi_i, \omega_i) \subseteq G$, and a subgraph formed by the vertex v and the related adjacent edge and the subgraph block $G_i$ is recorded as $G_{i,v}=(V_{i,v}, E_{i,v}, \psi_{i,v}, \omega_{i,v})$, wherein $V_{i,v}=V_i \cup \{v\}$, $E_{i,v}=E_i \cup N(v)$, $\psi_{i,v}=\psi_i \cup \{\psi(v)\}$, $\omega_{i,v}=\omega_i \cup \{\omega(N(v))\}$, such that the semantic serial degree of the subgraph block Gi into which the vertex expects to add is:

$SSD(v, G_i, A) = e^{-\rho x} \times deg(G_{i,v})$ wherein ρ is a preset constant.

Preferably, the step 5 specifically includes:
when randomly reading a vertex v from the G, respectively computing the semantic serial degree after the vertex v is assumed to be added into each subgraph block, respectively recording the semantic serial degrees as $SSD(v, G_1, A)$, $SSD(v, G_2, A), \ldots, SSD(v, G_k, A)$, selecting the subgraph block $$i_{max} = \arg\max_{1 \leq i \leq m}\{SSD(v, G_i, A)\}$$

corresponding to the maximum value, and then formally adding the vertex into the subgraph block $G_{i_{max}}$.

A computer readable medium is provided, wherein the graph clustering method based on the perception application algorithm semantics according to any of above is stored in the computer readable medium.

BRIEF DESCRIPTION OF THE DRAWINGS

FIGURE is a schematic diagram of a structure of a graph clustering method in accordance with the present invention.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the scope of protection of the present invention.

In the current era of big data, the scale of graph data is getting larger, with the total number of vertexes up to millions, tens of millions, and even hundreds of millions. In the analysis and processing of such big graph data, parallel distributed processing is required due to the limited computing power of a single computer, and the bit graph data can also be scheduled to be processed in a cloud environment currently. Moreover, due to the fact that the graph data applications are different, so do the algorithms employed, including a graph traversal algorithm, a shortest path algorithm, a strong connectivity algorithm, and a PageRank algorithm. Different algorithm execution semantics will have different impacts on parallel computing, for example, certain vertexes in the graph data will not participate in the execution of application algorithms, the placement of certain vertexes together in the application algorithm is not conducive to data access, communication and the like. Accordingly, in order to facilitate parallel computing and balance overheads for computing and communication, it is necessary to consider not only a "tight inside and loose outside" condition of the clustering blocks in the graph data structure, but also the execution semantics of the application algorithm, thereby achieving the matching of the data, system, and application algorithm, and making the parallel distributed computing for implementing the graph application analysis be conducted efficiently.

The graph clustering method in this embodiment has a main idea as follows: focusing on both graph data structure and application algorithm semantics at the same time, formulating a criterion needing to be met during clustering; and sequentially and continuously judging which target cluster block to which each vertex in the graph chooses to join according to the criterion, wherein the complete implementation process is as shown in FIGURE: by continuously reading the graph data, continuously adding read vertexes into a subgraph block according to the formulated rule; computing the semantic serial degree between the current vertex and the different subgraph blocks by considering both the data structure of the subgraph block and the execution pattern of the algorithm; and selecting the subgraph block with the maximum semantic serial degree, adding the vertex into the selected subgraph block until all the vertexes are processed, thus obtaining the subgraph block as a clustering result. Specific implementation steps are described as follows:

Step 1: acquiring original graph data G and a graph's application algorithm A, specifically as follows:
  acquiring the original graph data:

$$G=(V,E,cw,dw)$$

wherein V is a set of vertexes of the graph G; E is an edge set of the graph G; cw is a set of corresponding weights of the vertexes in the graph G; and dw is a set of corresponding weights of edges in the graph G; and
  acquiring the graph's application algorithm A, a given constant ρ and the number k of clustering blocks;
step 2: initializing a subgraph $G_i \leftarrow \phi$, i=1, 2, ..., k;
step 3: randomly selecting a vertex v and a corresponding connecting edge thereof from the graph G, and then deleting the v and the corresponding edge thereof from the graph G;
step 4: computing a semantic serial degree after adding the vertex v into the subgraph $G_i$;
step 5: determining a clustering block with the maximum semantic serial degree, and adding the vertex v and the corresponding connecting edge into the subgraph;
step 6: repeating the steps until the graph G is empty; and
step 7: completing graph clustering, and outputting a clustering result.

A core content of the graph clustering method in this embodiment includes:

(1) Computing of a Modularity of a Subgraph one subgraph block relates to two aspects of internal vertexes and edges and external connection of the subgraph block with other subgraph blocks. Apparently, the closer the internal structure of the subgraph block and the looser the external connection, the more the subgraph block itself suitable for serial computing; while the stronger the independence between different subgraph blocks, the more the subgraph blocks suitable for parallel computing. To this end, a concept of relative cohesion, which portrays the internal structure of the subgraph, and a concept of relative coupling, which portrays a correlation structure between the subgraphs, are proposed, and the modularity of one subgraph is further computed from the cohesion and coupling.

Assuming that one piece of graph data consists of k subgraph blocks $G_1, G_2, ..., G_k$, wherein any of the subgraph blocks is recorded as:

$$G_i=(V_i,E_i,\psi_i,\omega_i), \quad E_i=E_{in}(G_i)\cup E_{out}(G_i), \quad i\in\{1,2,...,k\},$$

$E_{in}(G_i)$ is a set of edges inside the $G_i$, and $E_{out}(G_i)$ is a set of cut edges of $G_i$ and all other subgraph blocks. A sum of weights of all vertexes in the subgraph block Gi is recorded as $\Psi(V_i)$, a sum of weights of all connecting edges in the subgraph block Gi is recorded as $\Omega(E_{in}(G_i))$, the total graph consisting of k subgraph blocks is recorded as $G_c=(V_c, E_c, \psi_c, \omega_c)$, wherein the sum of the weights of the vertexes of the total graph is recorded as $\Psi(V_c)$, and the sum of the weights of the connecting edges is recorded as $\Omega(E_c)$, such that the relative cohesion of the subgraph block $G_i$ is as follows:

$$coh(G_i) = \frac{2|E_{in}(G_i)|}{|V_i|\cdot(|V_i|-1)} \cdot \frac{\Omega(E_{in}(G_i))}{\Omega(E_c)} \cdot \frac{\Psi(V_i)}{\Psi(V_c)}$$

the relative coupling of the subgraph block $G_i$ and all other subgraph blocks $G_j$ is as follows:

$$cou(G_i, G_j) = \frac{|E_{cut}(G_i, G_j)|}{|V_i|\cdot|V_j|} \cdot \frac{\Omega(E_{cut}(G_i, G_j))}{\Omega(E_c)}$$

the modularity of the subgraph block $G_i$ is as follows:

$$deg(G_i) = coh(G_i)\left(1 - \sum_{j\neq i,j=1}^{k} cou(G_i, G_j)\right)$$

(2) Computing of Semantic Serial Degree

According to the execution of the graph's application algorithm on the graph data, the following execution patterns can be summarized: order pattern, con-order pattern, separate pattern, jump pattern, choice pattern, no computing pattern, and the like, among which, the order pattern is conducive to local serial computing, and the choice pattern and the separate pattern are conducive to distributed parallel computing. Therefore, in the clustering implementation process of the vertexes of the graph, if the execution pattern between the newly added vertex and the vertex in the subgraph block is conducive to the local serial computing, it is certainly that the vertex should be added into the subgraph block. In contrast, if the execution pattern between the newly added vertex and the vertex in the subgraph block is conducive to the distributed parallel computing, the vertex should not be added into the subgraph block at this time.

In order to quantize the criterion above, the concept of "semantic serial degree" is proposed by taking both the application algorithm semantics and graph structure information into consideration at the same time. Assuming that for the graph data G=(V, E, ψ, ω), an application algorithm for executing the graph data is A, different execution patterns have different parallel computing priorities which are recorded as x, a to-be-computed vertex is v∈V, a set of adjacent edges thereof is N(v)⊆E, a target subgraph block $G_i$ expected to be added is $G_i=(V_i, E_i, \psi_i, \omega_i)\subseteq G$, and a subgraph formed by the vertex v and the related adjacent edge and the subgraph block $G_i$ is recorded as $G_{i,v}=(V_{i,v}, E_{i,v}, \psi_{i,v}, \omega_{i,v})$, wherein $V_{i,v}=V_i\cup\{v\}$, $E_{i,v}=E_i\cup N(v)$, $\psi_{i,v}=\psi_i\cup\{\psi(v)\}$, $\omega_{i,v}=\omega_i\cup\{\omega(N(v))\}$, such that the semantic serial degree of the subgraph block Gi into which the vertex expects to add is:

$$SSD(v,G_i,A)=e^{-\rho x}\times deg(G_{i,v})$$

wherein ρ is a preset constant.

The embodiment further relates to a computer readable medium in which any of the graph clustering method above is stored.

Compared with the prior art, the present invention has the following beneficial effects:

The application analysis and mining of the big graph data are greatly accelerated: by considering the graph data structure and the execution pattern of the application algorithm while considering that the graph clustering block should meet the characteristics of "tight inside and loose outside", the graph clustering method in the present invention provides a computing method of the semantic serial degree. Based on this, the perception application algorithm semantics in the graph clustering method are highlighted, and a parallel distributed computing is supported by the graph clustering method. Compared with the traditional graph clustering method, the graph clustering method in the present invention takes the execution pattern of the graph's application algorithm into consideration, and combines the structure information of the graph data itself, so that the graph clustering result can be efficiently used for subsequent parallel distributed processing, and the application analysis and mining of the big graph data graph are greatly accelerated.

The above-described embodiments are only specific embodiments of the present invention, but the scope of protection of the present invention is not limited thereto. Any person familiar with the technical field of the present invention may readily devise various equivalent modifications or substitutions within the technical scope of the present invention, these modifications or substitutions should be encompassed within the scope of protection of the present invention. Therefore, the scope of protection of the present invention should be subject to the scope of protection of the claims.

What is claimed is:

1. A graph clustering method based on perception application algorithm semantics, comprising:
   step 1: acquiring original graph data G and a graph's application algorithm A;
   step 2: initializing a subgraph $G_i$;
   step 3: randomly selecting a vertex v and a corresponding connecting edge thereof from the graph G, and then deleting the vertex v and the corresponding edge thereof from the graph G;
   step 4: computing a semantic serial degree after adding the vertex v into the subgraph $G_i$;
   step 5: determining a clustering block with the maximum semantic serial degree, and adding the vertex v and the corresponding connecting edge into the subgraph, wherein an execution pattern between the added vertex v and the vertex v originally being in the subgraph is conducive to a local serial computing;
   step 6: repeating the steps 3 to 5 until the graph G is empty; and
   step 7: completing graph clustering, and outputting a clustering result,
   wherein the graph clustering meets "tight inside and loose outside",
   wherein an accelerate parallel distributed processing is completing by focusing on both a graph data structure and the application algorithm semantics at a same time, formulating a criterion needing to be met during clustering, and sequentially and continuously judging which target cluster block to which each vertex in the graph chooses to join according to the criterion.

2. The graph clustering method based on perception application algorithm semantics according to claim 1, wherein the step 1 further comprises:
   acquiring the original graph data:

$G=(V,E,cw,dw)$ wherein V is a set of vertexes of the graph G; E is an edge set of the graph G; cw is a set of corresponding weights of the vertexes in the graph G; and dw is a set of corresponding weights of edges in the graph G; and acquiring the graph's application algorithm A, a given constant ρ and the number k of clustering blocks.

3. The graph clustering method based on perception application algorithm semantics according to claim 1, wherein the step 4 further comprises:
   step 4-1: acquiring an execution pattern of the vertex v in the graph's application algorithm A, and acquiring a parallel priority x;
   step 4-2: computing modularity $m\_deg_i$ by adding the vertex v into the subgraph $G_i$; and
   step 4-3: computing the semantic serial degree $SSD_i=e^{-\rho x} \times m\_deg_i$ by adding the vertex v into the subgraph $G_i$.

4. The graph clustering method based on perception application algorithm semantics according to claim 3, wherein the step 4-1 is
   the execution pattern of the vertex v in the graph's application algorithm A comprises order pattern, con-order pattern, separate pattern, jump pattern, choice pattern and no computing pattern; the execution pattern is preset with the parallel priority x according to the degree in favor of parallel computing, and the parallel priority x is directly acquired according to a mapping relation after acquiring the execution pattern of the vertex v in the graph's application algorithm A.

5. The graph clustering method based on perception application algorithm semantics according to claim 3, wherein a computing method of the modularity is as follows:

$$deg(G_i) = coh(G_i)\left(1 - \sum_{j \neq i, j=1}^{k} cou(G_i, G_j)\right)$$

wherein $G_i$ is the subgraph block; $coh(G_i)$ is a relative cohesion of the subgraph block $G_i$; and $cou(G_i, G_j)$ is a relative coupling of the subgraph $G_i$ and all other subgraph blocks $G_j$.

6. The graph clustering method based on perception application algorithm semantics according to claim 5, wherein a computing method of the relative cohesion coh $(G_i)$ of the subgraph block $G_i$ is as follows:
   assuming that one piece of graph data consists of k subgraph blocks $G_1, G_2, \ldots, G_k$, wherein any of the subgraph blocks is recorded as:

$G_i=(V_i,E_i,\psi_i,\omega_i), \quad E_i=E_{in}(G_i) \cup E_{out}(G_i), \quad i \in \{1,2,\ldots,k\},$ the computing method of the relative cohesion is as follows:

$$coh(G_i) = \frac{2|E_{in}(G_i)|}{|V_i| \cdot (|V_i|-1)} \cdot \frac{\Omega(E_{in}(G_i))}{\Omega(E_c)} \cdot \frac{\Psi(V_i)}{\Psi(V_c)}$$

wherein $E_{in}(G_i)$ is a set of edges in the $G_i$; $E_{out}(G_i)$ is a set of cut edges of the $G_i$ and all other subgraph blocks; $\Psi(V_i)$ is a sum of weights of all vertexes in the subgraph block $G_i$; and $\Omega(E_{in}(G_i))$ is a sum of weights of all connecting edges in the subgraph block $G_i$; the total graph consisting of k subgraph blocks is recorded as $G_c=(V_c, E_c, \psi_c, \omega_c)$, $\Psi(V_c)$ is a sum of weights of vertexes of $G_c$, and $\Omega(E_c)$ is a sum of weights of connecting edges of the $G_c$.

7. The graph clustering method based on perception application algorithm semantics according to claim 5, wherein a computing method of the relative coupling cou ($G_i, G_j$) of the subgraph block $G_i$ and all other subgraph blocks $G_j$ is as follows:

$$cou(G_i, G_j) = \frac{|E_{cut}(G_i, G_j)|}{|V_i| \cdot |V_j|} \cdot \frac{\Omega(E_{cut}(G_i, G_j))}{\Omega(E_c)}.$$

8. The graph clustering method based on perception application algorithm semantics according to claim 3, wherein the step 4-3 is For the graph data G=(V, E, ψ, ω), assuming that an application algorithm for executing the graph data is A, the parallel priority is x, the to-be-calculated vertex is v∈V, the set of adjacent edges is N(v)⊆E, a target subgraph block expected to be added is $G_i(V_i, E_i, \psi_i, \omega_i)$⊆G, and a subgraph formed by the vertex v and the related adjacent edge and the subgraph block $G_i$ is recorded as $G_{i,v}=(V_{i,v}, E_{i,v}, \psi_{i,v}, \omega_{i,v})$, wherein $V_{i,v}=V_i\cup\{v\}$, $E_{i,v}=E_i\cup N(v)$, $\psi_{i,v}=\psi_i \cup\{\psi(v)\}$, $\omega_{i,v}=\omega_i\cup\{\omega(N(v))\}$, such that the semantic serial degree of the subgraph block Gi into which the vertex expects to add is:

$SSD(v, G_i, A) = e^{-\beta x} \times \deg(G_{i,v})$ wherein ρ is a preset constant.

9. The graph clustering method based on perception application algorithm semantics according to claim 1, wherein the step 5 further comprises:

when randomly reading a vertex v from the G, respectively computing the semantic serial degree after the vertex v is assumed to be added into each subgraph block, respectively recording the semantic serial degrees as SSD(v, $G_1$, A), SSD(v, $G_2$, A), . . . , SSD(v, $G_k$, A), selecting the subgraph block $$i_{max} = \arg\max_{1 \le i \le m}\{SSD(v, G_i, A)\}$$

corresponding to the maximum value, and then formally adding the vertex into the subgraph block $G_{i_{max}}$.

10. A non-transitory computer readable medium, storing a program of graph clustering based on perception application algorithm semantics, the program is executed by a processor, wherein the processor is configured to execute:

a, acquiring original graph data G and a graph's application algorithm A;
b. initializing a subgraph $G_i$;
c. randomly selecting a vertex v and a corresponding connecting edge thereof from the graph G, and then deleting the vertex v and the corresponding edge thereof from the graph G;
d. computing a semantic serial degree after adding the vertex v into the subgraph $G_i$;
e. determining a clustering block with the maximum semantic serial degree, and adding the vertex v and the corresponding connecting edge into the subgraph, wherein an execution pattern between the added vertex v and the vertex v originally being in the subgraph is conducive to a local serial computing;
repeating the c to the e until the graph G is empty; and completing graph clustering, and outputting a clustering result,
wherein the graph clustering meets "tight inside and loose outside",
wherein an accelerate parallel distributed processing is completing by focusing on both a graph data structure and the application algorithm semantics at a same time, formulating a criterion needing to be met during clustering, and sequentially and continuously judging which target cluster block to which each vertex in the graph chooses to join according to the criterion.

11. The non-transitory computer readable medium of claim 10, wherein the processor is further configured to execute:

acquiring the original graph data:

G=(V,E,cw,dw)

wherein V is a set of vertexes of the graph G; E is an edge set of the graph G; cw is a set of corresponding weights of the vertexes in the graph G; and dw is a set of corresponding weights of edges in the graph G; and
acquiring the graph's application algorithm A, a given constant ρ and the number k of clustering blocks.

12. The non-transitory computer readable medium of claim 10, wherein the processor is further configured to execute:

acquiring an execution pattern of the vertex v in the graph's application algorithm A, and acquiring a parallel priority x;
computing modularity m_$\deg_i$ by adding the vertex v into the subgraph Gi; and
computing the semantic serial degree $SSD_i = e^{-\rho x} \times m\_\deg_i$ by adding the vertex v into the subgraph G.

13. The non-transitory computer readable medium of claim 12, wherein the execution pattern of the vertex v in the graph's application algorithm A comprises order pattern, con-order pattern, separate pattern, jump pattern, choice pattern and no computing pattern; the execution pattern is preset with the parallel priority x according to the degree in favor of parallel computing, and the parallel priority x is directly acquired according to a mapping relation after acquiring the execution pattern of the vertex v in the graph's application algorithm A.

14. The non-transitory computer readable medium of claim 12, wherein a computing method of the modularity is as follows:

$$\deg(G_i) = coh(G_i)\left(1 - \sum_{j \ne i, j=1}^{k} cou(G_i, G_j)\right)$$

wherein $G_i$ is the subgraph block; $coh(G_i)$ is a relative cohesion of the subgraph block $G_i$; and $cou(G_i, G_j)$ is a relative coupling of the subgraph $G_i$ and all other subgraph blocks $G_j$.

15. The non-transitory computer readable medium of claim 14, wherein a computing method of the relative cohesion $coh(G_i)$ of the subgraph block $G_i$ is as follows:
assuming that one piece of graph data consists of k subgraph blocks $G_1, G_2, \ldots, G_k$, wherein any of the subgraph blocks is recorded as:

$G_i=(V_i, E_i, \psi_i, \omega_i)$,    $E_i=E_{in}(G_i)\cup E_{out}(G_i)$,    i∈ {1,2, . . . ,k}, the computing method of the relative cohesion is as follows:

$$coh(G_i) = \frac{2|E_{in}(G_i)|}{|V_i| \cdot (|V_i| - 1)} \cdot \frac{\Omega(E_{in}(G_i))}{\Omega(E_c)} \cdot \frac{\Psi(V_i)}{\Psi(V_c)}$$

wherein $E_{in}(G_i)$ is a set of edges in the $G_i$; $E_{out}(G_i)$ is a set of cut edges of the $G_i$ and all other subgraph blocks; $\Psi(V_i)$ is a sum of weights of all vertexes in the subgraph block $G_i$; and $\Omega(E_{in}(G_i))$ is a sum of weights of all connecting edges in the subgraph block $G_i$;

the total graph consisting of k subgraph blocks is recorded as $G_c=(V_c, E_c, \psi_c, \omega_c)$, $\Psi(V_c)$ is a sum of weights of vertexes of $G_c$, and $\Omega(E_c)$ is a sum of weights of connecting edges of the $G_c$.

16. The non-transitory computer readable medium of claim 14, wherein a computing method of the relative coupling $cou(G_i,G_j)$ of the subgraph block $G_i$ and all other subgraph blocks $G_j$ is as follows:

$$cou(G_i, G_j) = \frac{|E_{cut}(G_i, G_j)|}{|V_i| \cdot |V_j|} \cdot \frac{\Omega(E_{cut}(G_i, G_j))}{\Omega(E_c)}$$

17. The non-transitory computer readable medium of claim 10, wherein for the graph data $G=(V, E, \psi, \omega)$, assuming that an application algorithm for executing the graph data is A, the parallel priority is x, the to-be-calculated vertex is $v \in V$, the set of adjacent edges is $N(v) \subseteq E$, a target subgraph block expected to be added is $G_i=(V_i, E_i, \psi_i, \omega_i) \subseteq G$, and a subgraph formed by the vertex v and the related adjacent edge and the subgraph block $G_i$ is recorded as $G_{i,v}=(V_{i,v}, E_{i,v}, \psi_{i,v}, \omega_{i,v})$, wherein $V_{i,v}=V_i \cup \{v\}$, $E_{i,v}=E_i \cup N(v)$, $\psi_{i,v}=\psi_i \cup \{\psi(v)\}$, $\omega_{i,v}=\omega_i \cup \{\omega(N(v))\}$, such that the semantic serial degree of the subgraph block Gi into which the vertex expects to add is:

$$SSD(v,G_i,A)=e^{-\rho \cdot x} \times \deg(G_{i,v})$$

wherein $\rho$ is a preset constant.

18. The non-transitory computer readable medium of claim 10, wherein when randomly reading a vertex v from the G, respectively computing the semantic serial degree after the vertex v is assumed to be added into each subgraph block, respectively recording the semantic serial degrees as $SSD(v, G_1, A)$, $SSD(v, G_2, A)$, ..., $SSD(v, G_k, A)$, selecting the subgraph block $$i_{max} = \arg\max_{1 \leq i \leq m} \{SSD(v, G_i, A)\}$$

corresponding to the maximum value, and then formally adding the vertex into the subgraph block $G_{i_{max}}$.

* * * * *